US007680895B2

(12) United States Patent
Perlow et al.

(10) Patent No.: US 7,680,895 B2
(45) Date of Patent: Mar. 16, 2010

(54) INTEGRATED CONVERSATIONS HAVING BOTH EMAIL AND CHAT MESSAGES

(75) Inventors: Jonathan D. Perlow, San Franscico, CA (US); Michael Don Sego, Arcadia, CA (US); Nahush Mahajan, Sunnyvale, CA (US); Keith H. Coleman, Mountain View, CA (US); Adam Ross Barker, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 599 days.

(21) Appl. No.: 11/348,579

(22) Filed: Feb. 6, 2006

(65) Prior Publication Data

US 2007/0185961 A1 Aug. 9, 2007

(51) Int. Cl.
*G06F 15/16* (2006.01)
(52) U.S. Cl. ..................... 709/207; 709/206
(58) Field of Classification Search .............. 709/206
See application file for complete search history.

(56) References Cited

U.S. PATENT DOCUMENTS

| 2004/0054737 | A1* | 3/2004 | Daniell ..................... 709/206 |
| 2004/0064514 | A1 | 4/2004 | Daniell et al. ............. 709/206 |
| 2004/0078435 | A1 | 4/2004 | Dunbar et al. ............ 709/206 |
| 2004/0078446 | A1 | 4/2004 | Daniell et al. ............. 709/206 |
| 2004/0186885 | A1 | 9/2004 | Galli et al. ................ 709/206 |
| 2005/0080852 | A1* | 4/2005 | Kelley et al. .............. 709/206 |
| 2005/0132012 | A1* | 6/2005 | Muller et al. ............. 709/206 |
| 2005/0132013 | A1 | 6/2005 | Karstens ................... 709/206 |

OTHER PUBLICATIONS

Kanellos, M., "IBM Heeds Message to Integrate IM, e-mail," C|net News.Com, http://news.com.com/2102-1012_3-5165991.html?tag=st.util.print, Mar. 20, 2004.
Swearingen, C., et al., "NotesBuddy: A Unified Experience for Messaging," IBM, http://www.306.ibm.com/ibm/easy/eof_ext.nsf/publish/1979, Jun. 20, 2004.
Velasco, D., "AlphaWorks: Press: The New and Improved NotesBuddy 4.10," http://alphaworks.ibm.com/awap.nsf/alltype/52504035AC65D..., Dec. 2, 2002.
Printout of Transcript from a chat in IBM NotesBuddy, Dec. 7, 2005.
AlphaWorks, "Forums: Will NotesBuddy add auto msg archiving feature in next release?" http://www.128.ibm.com/developerworks/forums/dw_thread.jsp?for..., Sep. 19-20, 2005.
AlphaWorks, "Forums; saving Chat (SameTime) transcripts," http://www.128.ibm.com/developerworks/forums/dw_threads.jsp?form..., Apr. 13-Jul. 13, 2005.
International Search Report for International Application No. PCT/US2007/061711, dated Jul. 19, 2007.

* cited by examiner

*Primary Examiner*—Patrice Winder
*Assistant Examiner*—Taylor Elfervig
(74) *Attorney, Agent, or Firm*—Morgan, Lewis & Bockius LLP

(57) ABSTRACT

Email and chat messages may be displayed as part of the same conversation, in an integrated conversation view. The conversation view would include items corresponding to email messages that are part of the conversation and chat messages that are part of the conversation. A user may reply to an email message in the conversation by chat.

32 Claims, 14 Drawing Sheets

| View and Edit Profile | |
|---|---|
| First name: | Johannes |
| Last name: | Kaplan |
| Address: | 123 Main Blvd. |
| City: | Bigcity |
| State: | USA |
| Zip code: | 95959 |
| Phone Number: | (564) 654-7896 |
| Email: | jkaplan@efg.org |
| Company: | |

●
●
●

| Save | Cancel |

Figure 11C

INTEGRATED CONVERSATIONS HAVING BOTH EMAIL AND CHAT MESSAGES

RELATED APPLICATIONS

This application is related to the following applications, which are hereby incorporated by reference herein in their entirety:

U.S. patent application Ser. No. 11/348,578, titled "Integrated Email and Chat Archiving With Fine Grained User Control for Chat Archiving," filed Feb. 6, 2006;

U.S. patent application Ser. No. 11/348,577, titled "Time Line Display of Chat Conversations," filed Feb. 6, 2006; and U.S. patent application Ser. No. 11/348,576, titled "Contact List Search with Autocomplete," filed Feb. 6, 2006.

TECHNICAL FIELD

The disclosed embodiments relate generally to electronic messaging, and particularly, to an integrated conversation view of email and chat messages.

BACKGROUND

The Internet has grown to become an important outlet of electronic communication. Tools such as email and instant messaging (IM; sometimes also referred to as "chat") are popular amongst Internet users. These tools help users stay connected to each other and help them become more productive.

Email and IM have generally been considered to be separate and distinct. As a result, applications for email and IM are not designed to efficiently use them together. This can inconvenience users, reduce users' productivity, and limits the potential of email and IM as communications tools. A system that integrates email and IM would be desirable.

SUMMARY

According to some embodiments, a method of processing messages includes receiving one or more email messages in a conversation between a first user and a second user; receiving a chat message that responds to one of the email messages in the conversation; and transmitting for display at a client device a representation of the conversation, including items corresponding to each of the email messages in the conversation and an item corresponding to the chat message.

According to some embodiments, a method of processing messages includes receiving and sending a plurality of email messages in a conversation between a first user and a second user; sending a chat message from the first user to the second user that responds to one of the email messages in the conversation; and displaying at a client device associated with the first user a representation of the conversation, including items corresponding to each of the email messages in the conversation and an item corresponding to the chat message.

BRIEF DESCRIPTION OF THE DRAWINGS

FIGS. 11A, 11B, and 11C are diagrams illustrating searches of a contact list and a contact profile, in accordance with some embodiments.

Like reference numerals refer to corresponding parts throughout the drawings.

DESCRIPTION OF EMBODIMENTS

Figure 1:
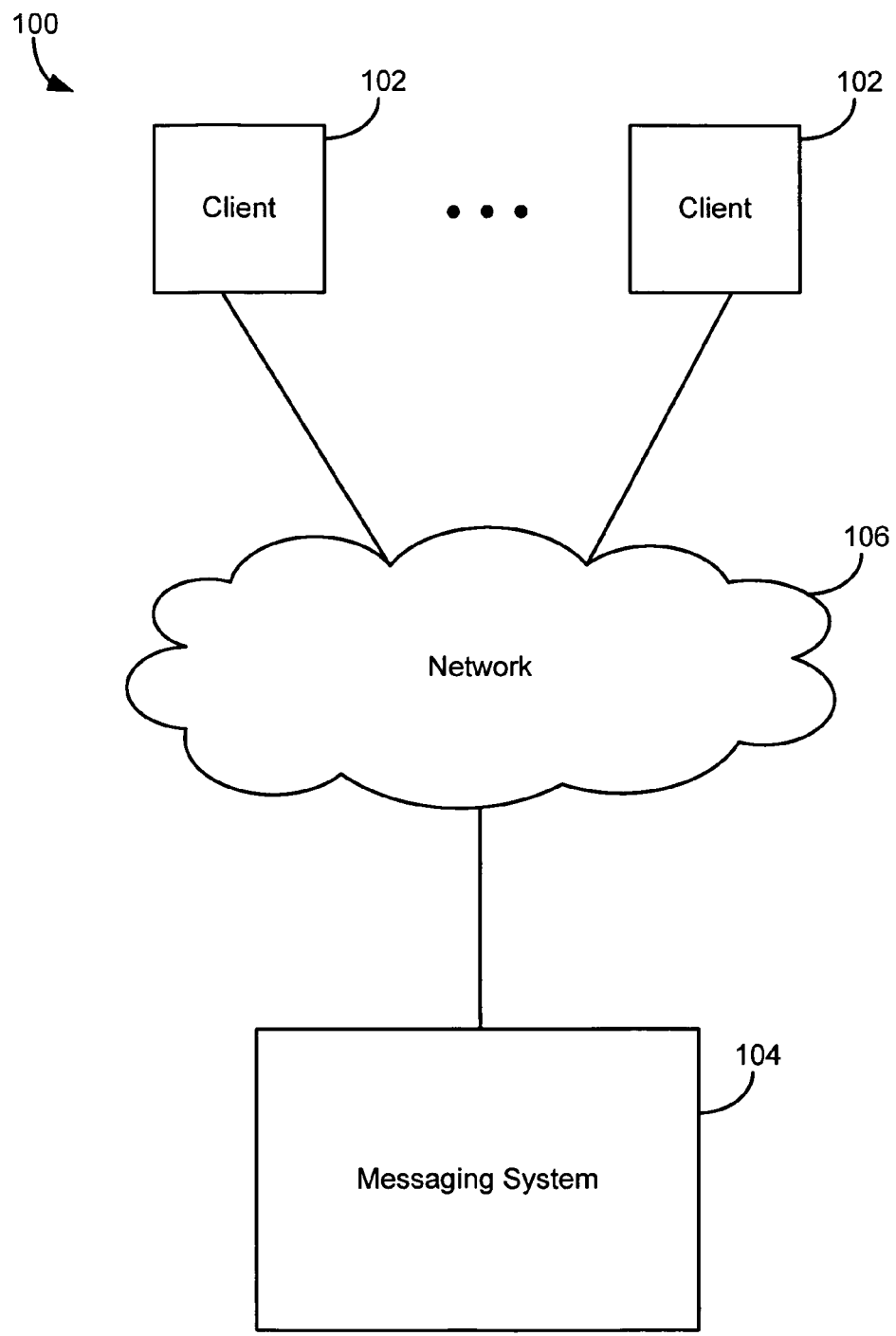
FIG. 1 is a block diagram illustrating a messaging network, in accordance with some embodiments.

FIG. 1 is a block diagram illustrating a messaging network, in accordance with some embodiments. The messaging network 100 includes a plurality of clients 102, a messaging system 104, and a network 106 that interconnects these components. The network 106 may include local area networks (LAN), wide area networks (WAN), wireless networks, the Internet, and so forth.

The clients 102 are devices through which users may communicate with each other. The client devices 102 may include, without limitation, personal computers, notebook computers, network terminals, mobile phones, and personal digital assistants (PDAs). A user at a first client can send messages to another user at a second client. In some embodiments, a client 102 may include one or more standalone messaging applications for sending messages. Examples of such clients may include email applications and instant messaging (IM, also referred to as chat) applications. In some other embodiments, the client 102 may include a web browser for accessing one or more web-based messaging applications. The web-based applications include script-based applications that are run from the web browser.

From the messaging applications (standalone or web-based), a user can compose and send messages. The client application can also display messages sent by the client and messages received by the client. The messages may include email messages and chat messages. In some embodiments, the client application also includes tools for managing one or more contact lists.

Messages composed at a first client, which may include email messages and IM (chat) messages, may be sent to a second client. In some embodiments, the message is sent to the second client via a messaging system 104. That is, the message is sent to a messaging system 104 and the second client receives the message from the messaging system 104. In some other embodiments, the first and second client establish a connection to each other and the first client can send the message directly to the second client. In these embodiments, sometimes called peer-to-peer systems, the messaging system 104 facilitates the establishment of the connection between the first and second clients but does not act as a middleman for the first and second clients with respect to the message itself.

The messaging system 104 provides messaging services to clients 102. The messaging system 104 receives a message from a sending client and delivers them to a recipient client. The messages handled by the messaging system 104 may include both email messages and chat messages. The messaging system 104 may maintain copies of received messages in a repository (hereinafter referred to as "archiving" of messages). In some embodiments, the messaging system 104 also may facilitate peer-to-peer connections between clients, so that the connected clients can send messages to each other without having to use the messaging system 104 as a relay. The messaging system 104 may include one or more messaging servers 300, further details of which are described below in relation to FIG. 3.

In some embodiments, the messaging system 104 requires that a user of the system set up a personal account with the system. Within the messaging system 104, messages and contact lists belonging to a user may be associated with the user's personal account.

In some embodiments, the messaging system 104 also manages presence information for the users of the system. That is, the messaging system may identify a user as online, offline, busy, and so forth; maintain such presence information; and provide such presence information to other users.

As described above, the messages processed by the messaging system 104 may include email messages or IM (chat) messages. For chat messages, one or more chat messages can form a chat session. A chat session includes messages sent and received in a chat window from when the chat window is first opened until when the chat window is closed.

Figure 2:
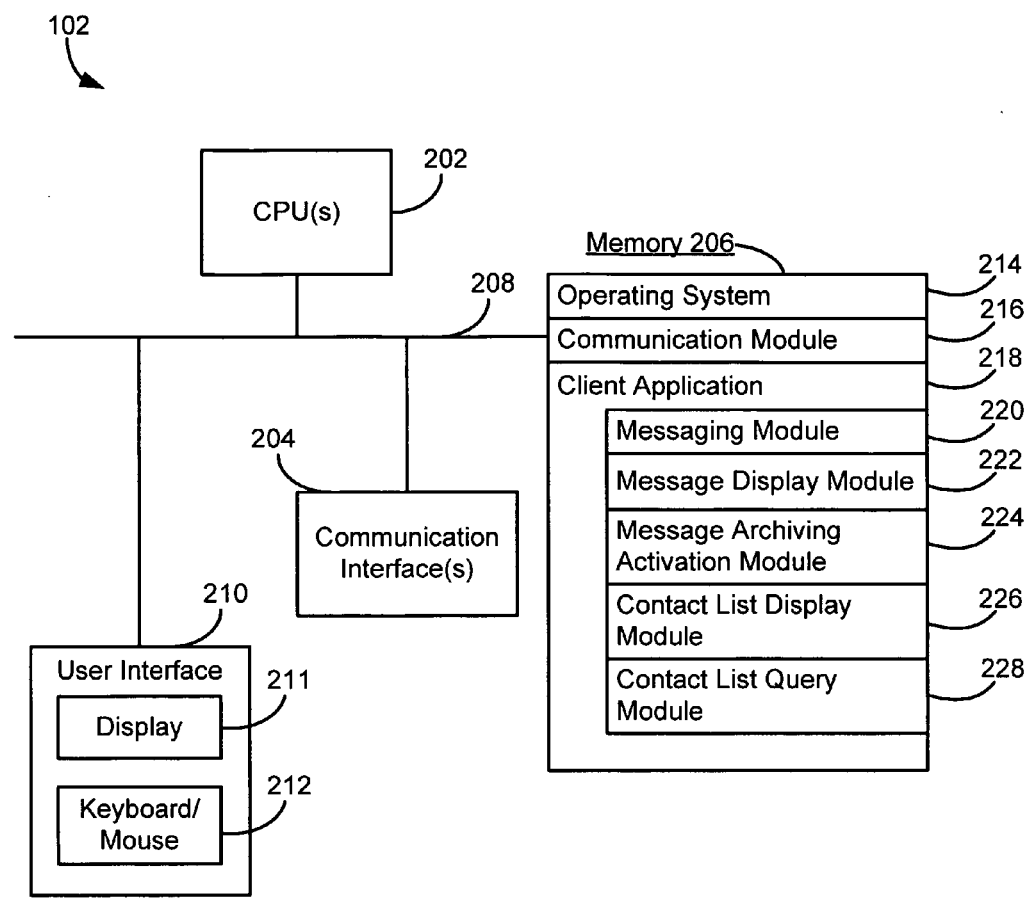
FIG. 2 is a block diagram illustrating a client computer, in accordance with some embodiments.

FIG. 2 is a block diagram illustrating a client computer, in accordance with some embodiments. The client computer 102 typically includes one or more processing units (CPU's) 202, one or more network or other communications interfaces 204, memory 206, and one or more communication buses 208 for interconnecting these components. The client computer 102 includes a user interface 210 comprising a display device 211 and input devices 212 such as a keyboard and/or mouse. The memory 206 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 302. Memory 206, or alternatively one or more storage devices (e.g., one or more nonvolatile storage devices) within memory 206, includes a computer readable storage medium. In some embodiments, the computer readable storage medium stores the following programs, modules and data structures, or a subset thereof:

- an operating system 214 that includes procedures for handling various basic system services and for performing hardware dependent tasks;
- a network communication module 216 that is used for connecting the client computer 102 to other computers via the one or more communication network interfaces 204 (wired or wireless) and one or more communication networks 106, such as the Internet, other wide area networks, local area networks, metropolitan area networks, and so on; and
- a client application 218 for sending, receiving, and displaying messages and managing contact lists.

In some embodiments, the client application 206 includes a messaging module 220, a message display module 222, a message archiving activation module 224, a contact list display module 226, and a contact list query module 228. The messaging module 220 sends messages to and receives messages from the messaging system 104 or from other clients. The message display module 222 displays messages on a display device for viewing by users, including generating and displaying conversational views of messages. The message archiving activation module 224 sends user commands to activate or deactivate archiving of messages to the messaging system 104. The contact list display module 226 displays users' contact lists. The contact list query module 228 receives and processes queries for contacts in the contact lists.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Figure 3:
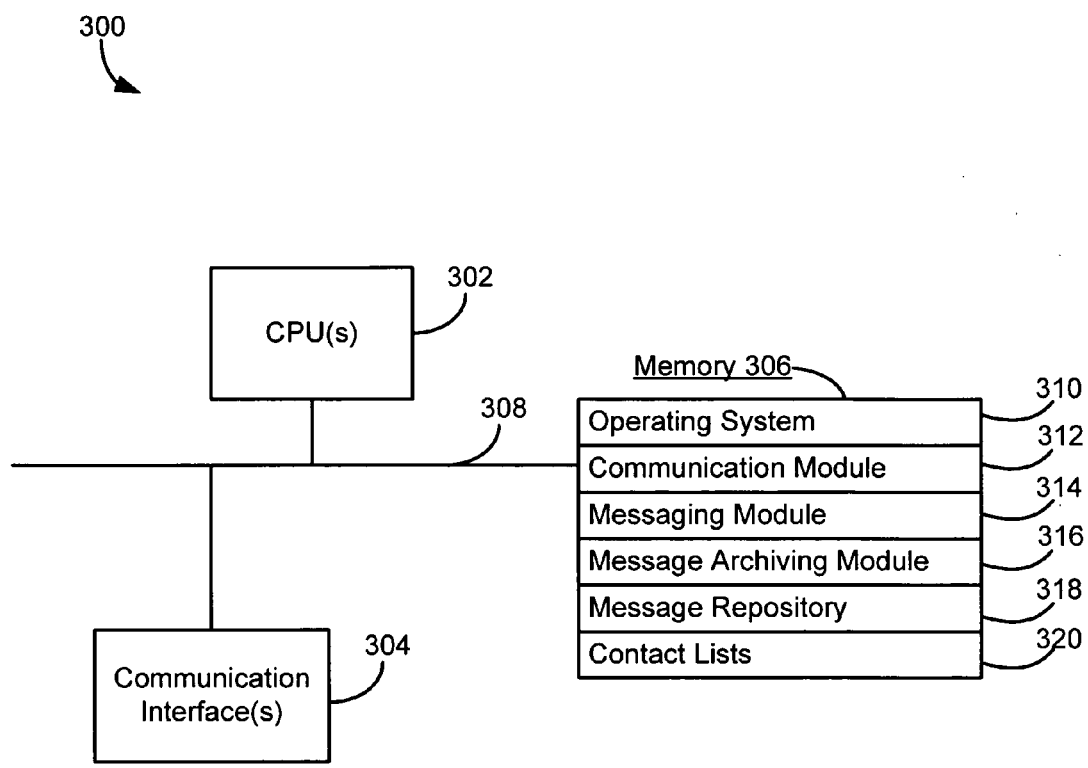
FIG. 3 is a block diagram illustrating a messaging server computer, in accordance with some embodiments.

FIG. 3 is a block diagram illustrating a messaging server, in accordance with some embodiments. The messaging server 300 typically includes one or more processing units (CPU's) 302, one or more network or other communications interfaces 304, memory 306, and one or more communication buses 308 for interconnecting these components. The messaging server 300 optionally may include a user interface comprising a display device and a keyboard/mouse (not shown). The memory 306 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively one or more storage devices (e.g., one or more nonvolatile storage devices) within memory 306, includes a computer readable storage medium. In some embodiments, the computer readable storage medium stores the following programs, modules and data structures, or a subset thereof:

- an operating system 310 that includes procedures for handling various basic system services and for performing hardware dependent tasks;
- a network communication module 312 that is used for connecting the messaging server 104 to other computers via the one or more communication network interfaces 304 (wired or wireless), such as the Internet, other wide area networks, local area networks, metropolitan area networks, and so on;
- a messaging module 314 for receiving messages from and sending messages to clients;
- a messaging archiving module 316 for archiving messages;
- a message repository 318 for storing archived messages; and
- contact lists 320 for storing users' contact lists.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above.

Although FIG. 3 shows a "messaging server," FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a messaging server and how features are allocated among them will vary from one implementation to another, and may depend in part on the amount of data traffic that the system must handle during peak usage periods as well as during average usage periods.

Integrated Conversation View of Email and Chat Messages

One area in which email and chat may become more integrated is in their storage and display. Emails are already stored at servers as part of its normal operation. Chat messages may be stored at servers as well. Indeed, chat messages may be stored, and optionally indexed, in a manner that is similar to the storage of email messages. Because chat messages can be stored in a manner similar to email messages, they can also be associated with email message conversations and displayed along with email messages in the conversation.

Figure 4:
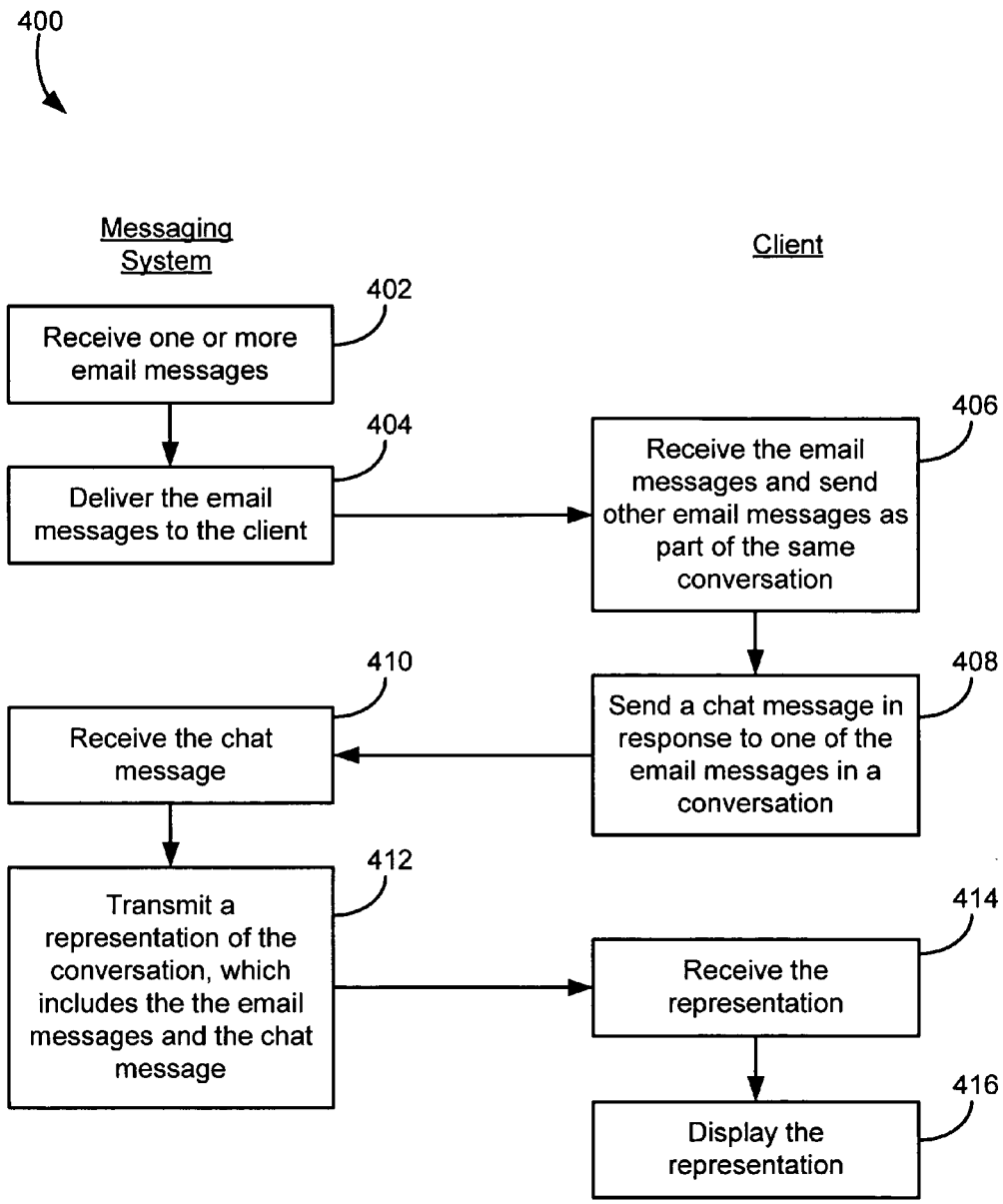
FIG. 4 is a flow diagram of a process for displaying an integrated conversation view email and chat messages, in accordance with some embodiments.

FIG. 4 is a flow diagram of a process for displaying an integrated conversation view of messages that includes email messages and chat messages, in accordance with some embodiments. In some embodiments, a conversation includes one or more relevant messages covering a conversation topic, and all the senders and recipients of the messages are participants of the conversation. In some other embodiments, other criteria may be used to determine which messages are part of the conversation. Process flow 400 describes a process for displaying the messages in a conversation, where the messages include both email messages and chat messages.

One or more email messages in a conversation are received by a messaging system from a first client (402). The messaging system also archives the email messages. The email messages are delivered to a second client (404). The second client receives the messages from the messaging server (406). A user at the second client may compose one or more email messages in the same conversation as the received messages. For example, the user at the second client may reply to one of the email messages in the conversation. These messages, which are also part of the conversation, are sent to the messaging system.

The user at the second client also replies to one of the email messages in the conversation with a chat message. In some embodiments, the user can reply by chat only if the user at the first client (the sender of the email messages) is online. The reply chat message is sent to the messaging system (408). The messaging system receives the reply chat message (410). The chat message initiates a chat session, which may include further chat messages sent by the user at the second client and may also include chat messages sent by the user at the first client. In some embodiments, the messaging system archives all or parts of the chat session and associates the chat session with the conversation.

The messaging system sends to the second client a representation of the conversation that includes the email messages and the chat message(s) (412). The second client receives the representation (414). The representation of the conversation is displayed (416). The representation includes the email messages and chat messages displayed in the same window.

In some embodiments, the user can also reply to an archived chat message or an archived chat session by email. The reply email and the archived chat message/session may be displayed together as a conversation, similar to the displaying of emails and chat messages in a conversation as described above.

Figure 8:
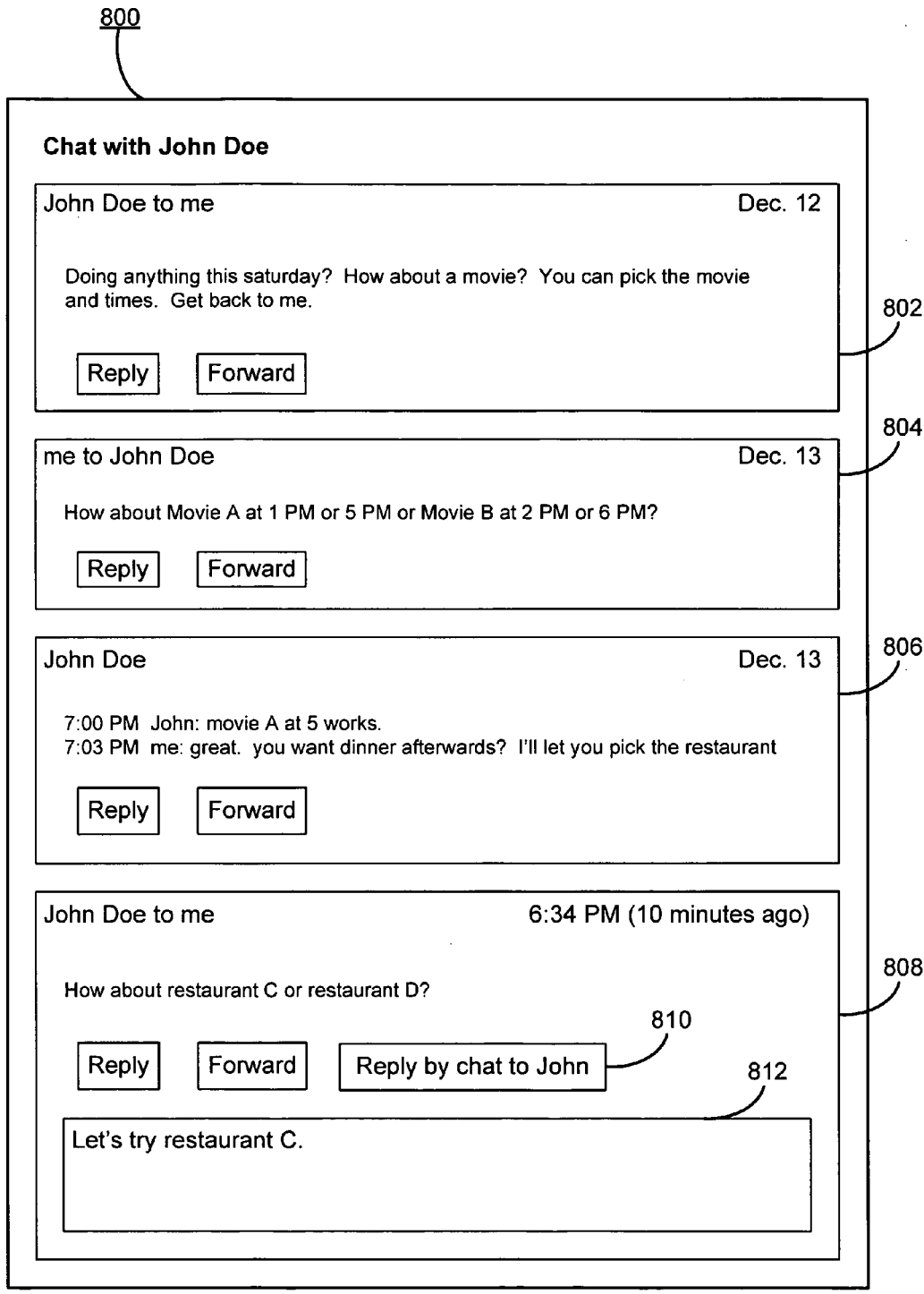
FIG. 8 is a diagram illustrating an integrated conversation view of email and chat messages, in accordance with some embodiments.

An example of a representation of an integrated conversation view of email and chat messages is shown in FIG. 8. A conversation window 800 displays the messages in a conversation, including both email messages and chat messages. The conversation window 800 includes a plurality of panels 802, 804, 806, and 808. The panels include panels for email messages 802, 804, 808 and a panel for chat sessions 806. The conversation window 800 may include as many email message panels and as many chat session panels as needed to display the email messages and chat sessions in the conversation.

The panels are arranged in chronological order and may show the dates of the message(s) and the sender of the message(s). The panels also include links (or buttons) for replying to or forwarding a particular message. In one or more of the panels 802, 804, 808 that show email messages, a text field 812 for entering a reply is included. Also included is a link 810 (or button) to reply to the email message via chat. The link to reply by chat allows the user to reply to the message with near-real time chat messages to the sender of the message, rather than sending a non-real time email message. In some embodiments, the link 810 to reply by chat is available only for the most recent message in the conversation.

Timeline View of Chat Messages

Figure 5A:
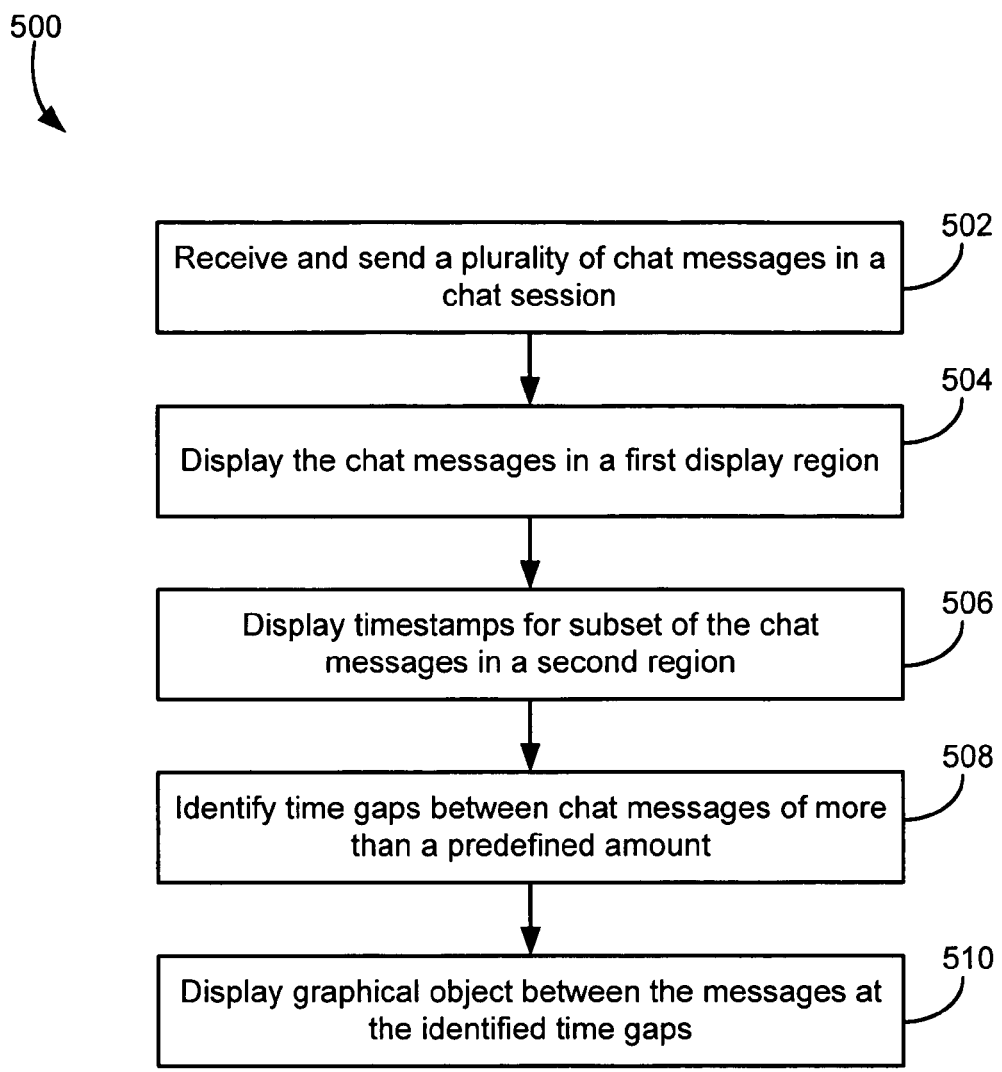
FIGS. 5A and 5B are flow diagrams of processes for displaying a timeline view of chat messages, in accordance with some embodiments.
Figure 5B:
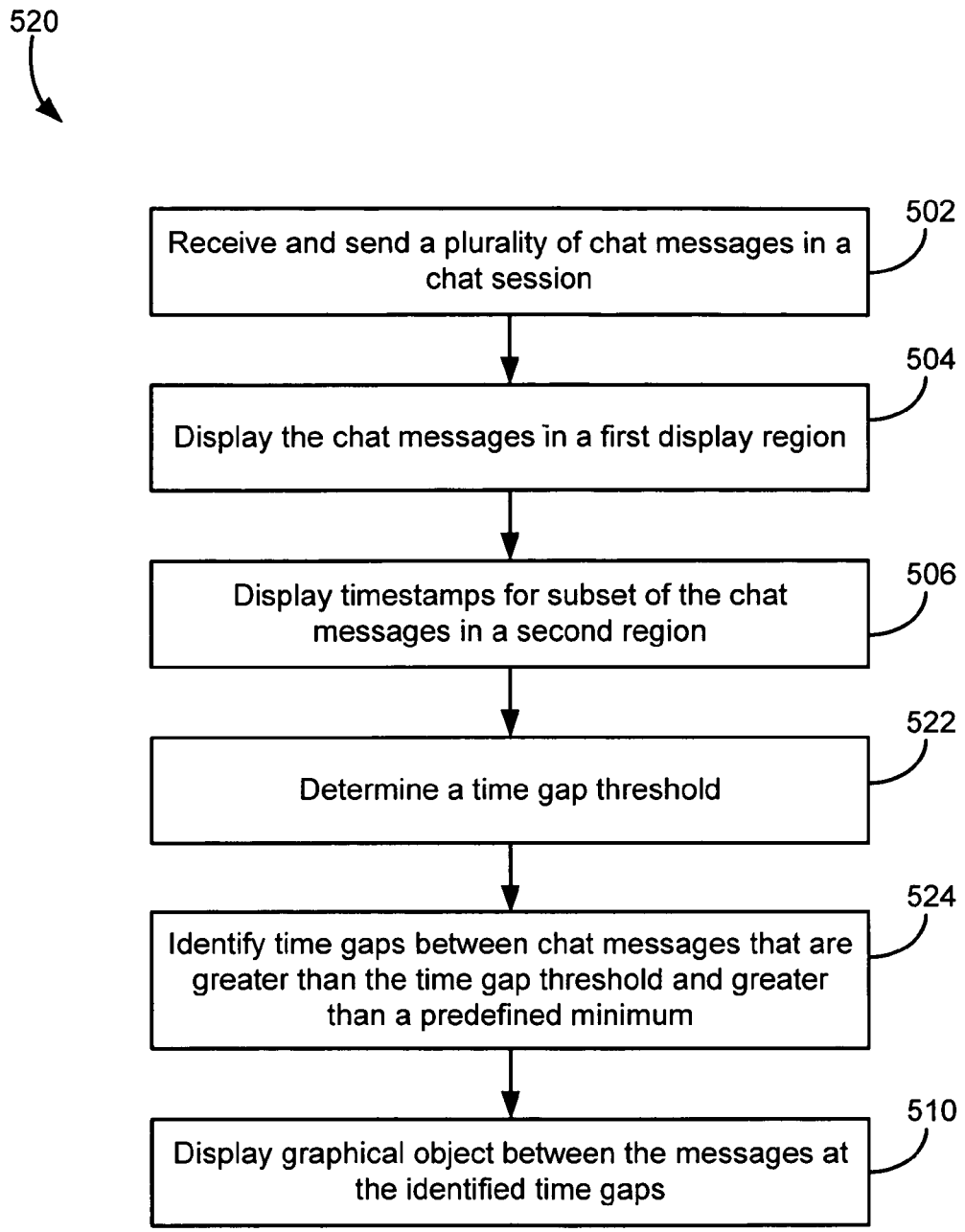

FIGS. 5A and 5B are flow diagrams of processes for displaying a timeline view of chat messages, in accordance with some embodiments. Chat messages of a chat session, if archived, may be displayed as a transcript of sorts. The transcript may be displayed in a timeline style, with messages in one display area, timestamps of the messages in a second display area, and the messages are aligned with their respective timestamps.

In process flow 500, a plurality of chat messages in a chat session are received by and sent from a first client (502). A user at the first client may send one or more chat messages of a chat session to a second client. The first client also may receive one or more chat messages of the same chat session from the second client. The messages may be archived by a messaging system, and the first (or second) client may request a display of the archived messages.

When the first client requests a display of the archived messages of the chat session, the received and sent chat messages are displayed in a first display region of a window (504). In a second display region, timestamps for at least a subset of the messages are displayed (506). In some embodiments, the second display region is adjacent, but does not overlap the first display region. Timestamps need not be displayed for all of the chat messages in the chat session. In some embodiments, the time units of the displayed timestamps are hours and minutes but not seconds. In such a case, one timestamp may be shown for messages that occur within the same minute. In other embodiments, a single timestamp is shown for messages that occur with the same two-minute period, or for messages that occur within the same five-minute period. Time gaps (or breaks) between consecutive messages in the session that are more than a predefined amount are identified (508). The time gaps may be identified by comparing the timestamps of the messages. For the identified time gaps, graphical objects that indicate the time gap are displayed in the window (510). An example of a graphical object that may be displayed is a line that runs across both first and second display regions. In some embodiments, the graphical object also includes an indication of the time elapsed during the respective time gap.

An alternative embodiment of the process for displaying a timeline view of chat messages is shown in FIG. 5B. In process flow 520, a plurality of chat messages in a chat session are received by and sent from a first client (502). The chat messages are displayed in a first display region (504). Timestamps for at least a subset of the chat messages are displayed in a second display region (506).

A time gap threshold is determined (522). The time gap threshold is based on the timestamp differences (the time gaps) for respective pairs of consecutive messages in the chat session. In a chat session of x messages, there are a total of x−1 time gaps between pairs of consecutive messages. The time gap threshold is determined based on these time gaps.

An exemplary formula for the time gap threshold may be:

$$T=M\alpha,$$

where T is the time gap threshold, and $\alpha$ is a predefined constant. In some embodiments, $\alpha$ is equal to 4.

In some embodiments, M is the arithmetic mean of the x−1 timestamp differences in the chat session. For example, if a chat session has 6 messages and timestamp differences of 1, 4, 10, 27, and 37 minutes, then M is 15.8 minutes, which may be rounded to 16 minutes in some embodiments. In some other embodiments, M is the median of the x−1 timestamp differences in the chat session. For example, if a chat session has 6 messages and timestamp differences of 1, 4, 10, 27, and 37 minutes, then M is 10 minutes.

Time gaps (or breaks) between consecutive messages in the session that are both more than a predefined amount and more than T are identified (524). In some embodiments, the predefined amount is 5 minutes. The predefined amount serves to separate out the potentially "significant" time gaps from those that are very short and trivial, and T separates the "significant" time gaps from the "not as significant" time gaps. Here, "significant" time gaps are those time gaps that are greater than the mean or median time gap by at least a factor $\alpha$. As in block 508, the time gaps may be identified by comparing the timestamps of the messages. For the identified time gaps, graphical objects that indicate the time gap are displayed in the window (510).

The timeline view improves readability of chat transcripts by separating the timestamps from the messages. Furthermore, the timeline view reduces information clutter in chat transcripts by omitting some of the timestamps from display, and by confining the displayed timestamps to a different region than the region in which the chat messages are displayed. Just as in a timeline of events, where events that take place in the same year (if the year is the basic unit in the timeline) are associated with the same year, messages that occur in the same minute (if the minute is the basic unit in the chat transcript timeline, or in the same N-minute time period when the basic time unit in the chat transcript timeline is N-minutes) are associated with the same timestamp. Also, by taking into account the mean or median time gap, the displaying of graphical objects for time gaps may be limited to the "significant" breaks in the chat session.

Figure 9:
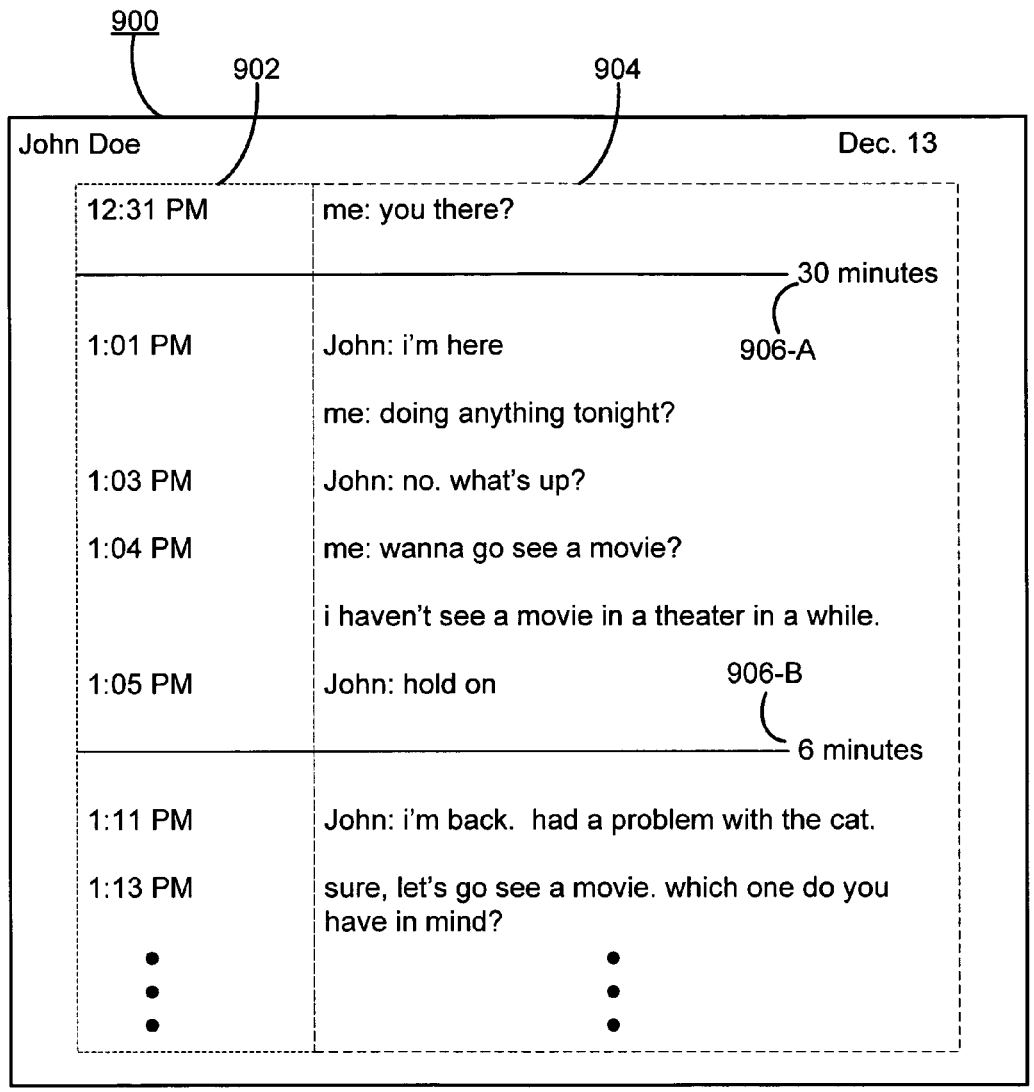
FIG. 9 is a diagram illustrating a timeline view of chat messages, in accordance with some embodiments.

An example of a timeline view of chat messages is shown in FIG. 9. The window 900 showing the transcript of a chat session includes a first display region 904 for displaying the messages and a second display region 902 for displaying the timestamps of the chat messages. The messages are aligned with their respective timestamps. The timestamps are displayed in hours and minutes, omitting the seconds. The timestamp display region 902 displays separate timestamps for less than all of the messages in the message display region 904; a timestamp of a respective message is omitted from display if the respective message has the same timestamp (i.e., falls within the same basic time unit) as another, earlier message. In the example shown in FIG. 9, there are two messages having a timestamp of 1:01 PM and two messages having a timestamp of 1:04 PM. Chat session breaks 906-A and 906-B, corresponding to periods of no messaging activity having a duration longer than a predefined amount of time, are shown with break lines. In the example shown in FIG. 9, the "predefined amount of time," which can also be called the break time threshold, is five minutes. The chat session breaks 906-A, 906-B also indicate the amount of time elapsed during the breaks. For example, the break 906-A indicates a 30-minute break in messaging activity, and break 906-B indicates a 6-minute break in messaging activity.

Control of Archiving of Chat Messages

Figure 6:
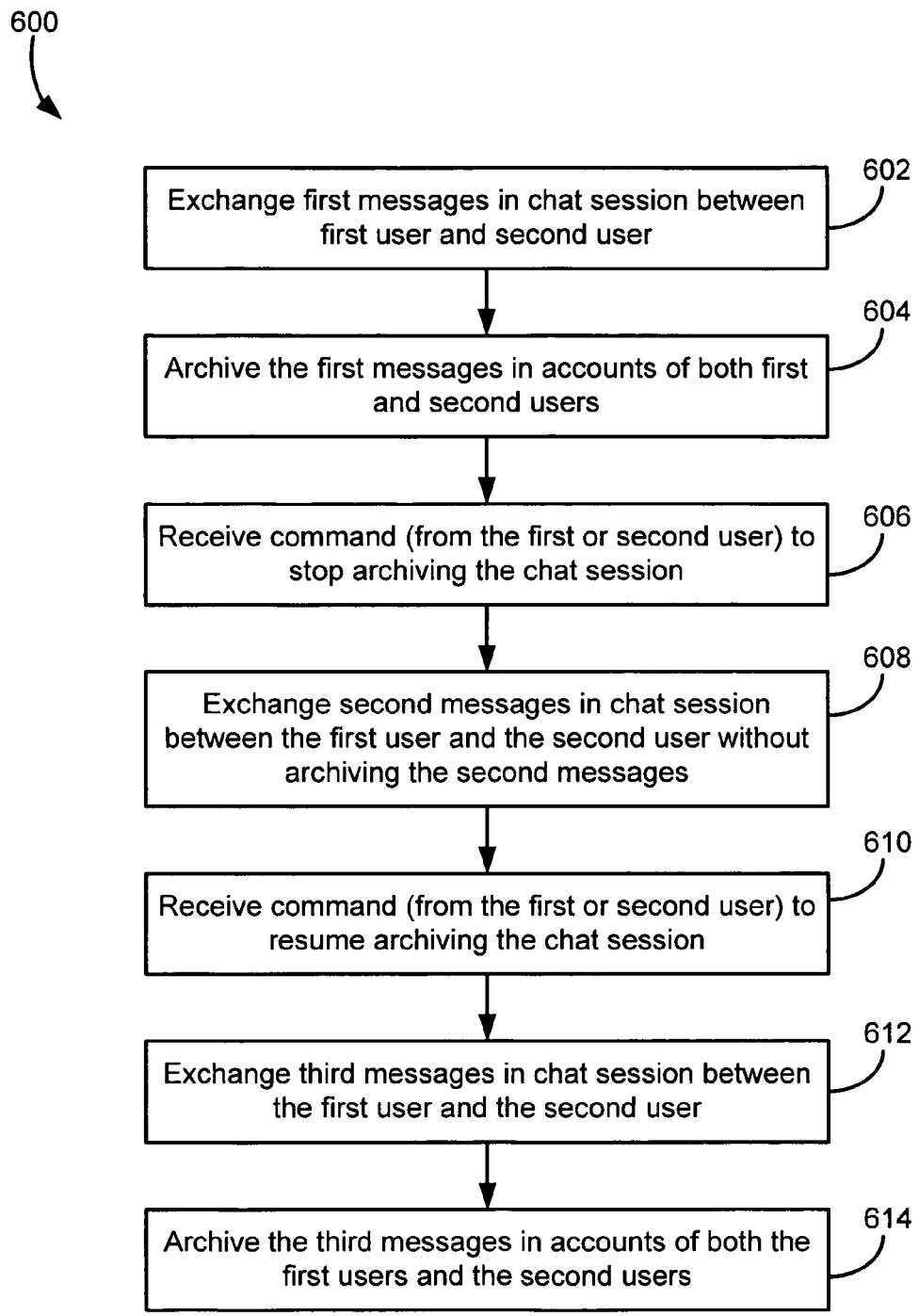
FIG. 6 is a flow diagram of a process for restricting archiving of chat messages, in accordance with some embodiments.

FIG. 6 is a flow diagram of a process for restricting archiving of chat messages, in accordance with some embodiments. Process flow 600 describes a process whereby participant users in a chat session may control the archiving of particular messages in the chat session.

A first set of chat messages are exchanged in a chat session between a first user and a second user (602). A first user at the first client sends chat messages to a second user at a second client, and vice versa. The first client also receives chat messages originating from the second client, and vice versa. The messages are sent to the recipient clients via the messaging system; a message is sent by the sender client to the messaging system, and the messaging system delivers the message to the recipient client.

The first set of chat messages in the chat session are archived by the messaging system (604). At least one copy of each message in the first set is stored in a repository. In some embodiments, two copies of each of the messages in the first set are stored in the repository, one each for both accounts of the first user and the second user. In some other embodiments, one copy of each of the messages is stored in the repository, but the copy is associated with the accounts of both the first user and the second user. The chat messages may be stored as separate documents containing the individual messages or in one document containing all messages from the chat session.

A command to stop archiving the chat session is received by the messaging system (606). The command may be sent by either the first user or the second user. More generally, the command to stop archiving may be sent by any of the plurality of participant users in a chat session. In some embodiments, when any participant user in a chat session commands the messaging system to stop archiving the chat session, subsequent messages of the chat session are not archived at all for all participant users of the chat session. In an alternate embodiment, if a participant user commands the messaging system to stop archiving the chat session, subsequent messages of the chat session are not archived only for the participant user who made the instruction to stop archiving (i.e., the requesting user's subsequent messages are not archived, but the messages of other users continued to be archived (unless those users have also made stop-archiving requests)).

A second set of chat messages are exchanged in the session between the first and second users (608). The second set of messages is not archived by the messaging system, in accordance with the received command to stop archiving the chat session. As described above, in some embodiments, the second set of messages is archived for neither the first user nor the second user. In the above-mentioned alternate embodiment, the requesting user's messages in the second set are not archived, but other users' messages in the second set continued to be archived, unless those users have also made stop-archiving requests.

It should be appreciated, however, that the command to stop archiving only affects messages subsequent to the command. It has no effect on messages preceding the command. Thus, messages preceding the command that have already been archived are still archived and available for future review.

A command to resume (or start) archiving of the chat session is received by the messaging system (610). As with the command to stop archiving the chat session, the command may be sent by either the first user or the second user. In some embodiments, the command applies to all participant users in the chat session; archiving is resumed for all participants of the chat session, for whom archiving were stopped by a previous command to stop archiving. Thus, in a two-person chat session, either participant may issue the command to stop archiving or to resume archiving at any given moment, and the command applies to both participants. In some other embodiments, archiving is resumed only for the chat session participant that made the command to resume archiving. Other chat session participants for whom archiving may have been stopped by a command to stop archiving are not affected.

A third set of chat messages are exchanged in the session between the first and second users (612). The third set of messages is archived by the messaging system, in accordance with the command to resume archiving (614). As with the command to stop archiving, the command to resume archiving affects only messages subsequent to the command; messages preceding the command that are not archived are not restored into the repository. For subsequent messages in the chat session, the first or the second user can toggle the archiving as desired, similar to the toggling (commands to stop/resume archiving) described above.

Thus, by controlling the archiving of a chat session, or more particularly, controlling the archiving of particular messages in the chat session, users participating in a chat session can make parts of the chat session "off the record" as desired.

In the embodiments described above, the chat session started with archiving active. In some other embodiments, a chat session may start with the archiving off and the user who desires to have the chat session archived must make the command to start archiving in order to activate the archiving.

Figure 10:
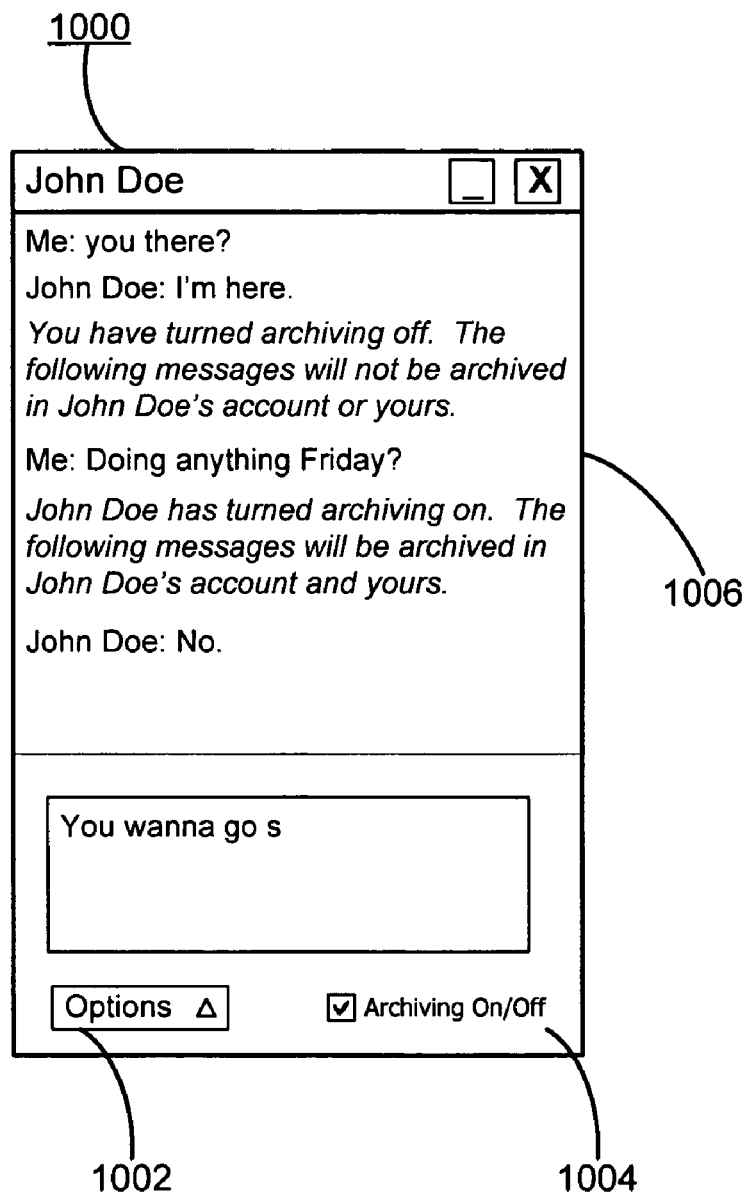
FIG. 10 is a diagram illustrating a chat window with control over archiving of chat messages, in accordance with some embodiments.

FIG. 10 is a diagram illustrating a chat window with control over archiving of chat messages, in accordance with some embodiments. The participants in a chat session may be provided an option to allow or restrict archiving of chat messages in the chat session. In some embodiments, a toggle 1004 for controlling the archiving of messages in the session may be provided within the chat window 1000. The toggle 1004 (shown in FIG. 10 as a checkbox) allows a user to turn archiving on or off for subsequent messages. In some other embodiments, the archiving toggle may be located in another location in the chat window, such as an options menu 1002.

If the user deactivates archiving, then messages subsequent to the deactivation are not archived until archiving is activated. In some embodiments, a message will be displayed in the message panel 1006 alerting the user that archiving has been deactivated and that subsequent messages will not be archived. If the user activates archiving, then messages subsequent to the activation are archived until archiving is deactivated. In some embodiments, a message will be displayed in the message panel 1006 alerting the user that archiving has been activated and that subsequent messages will be archived.

In some embodiments, the default setting for archiving when a new chat session is started is that archiving is active. Thus, if a user wants to keep any of the messages in the session "off the record," he needs to deactivate the archiving; the user has to opt out of the archiving. In some other embodiments, the default is that archiving is off; a user that wants to have chat messages archived has to opt into the archiving by making the command to activate it.

While the description of the embodiments above is in the context of a two-user chat session, the disclosed embodiments are also applicable to a chat session with more than two participants, such as chat rooms and multi-user chat. Thus, in some embodiments, any of the participants in a chat room or a multi-user chat session may, at any moment, issue the command to stop or resume archiving, and the command is applicable to all of the participants in the chat room or the multi-user chat session.

Contact List Search with Autocomplete

Figure 7A:
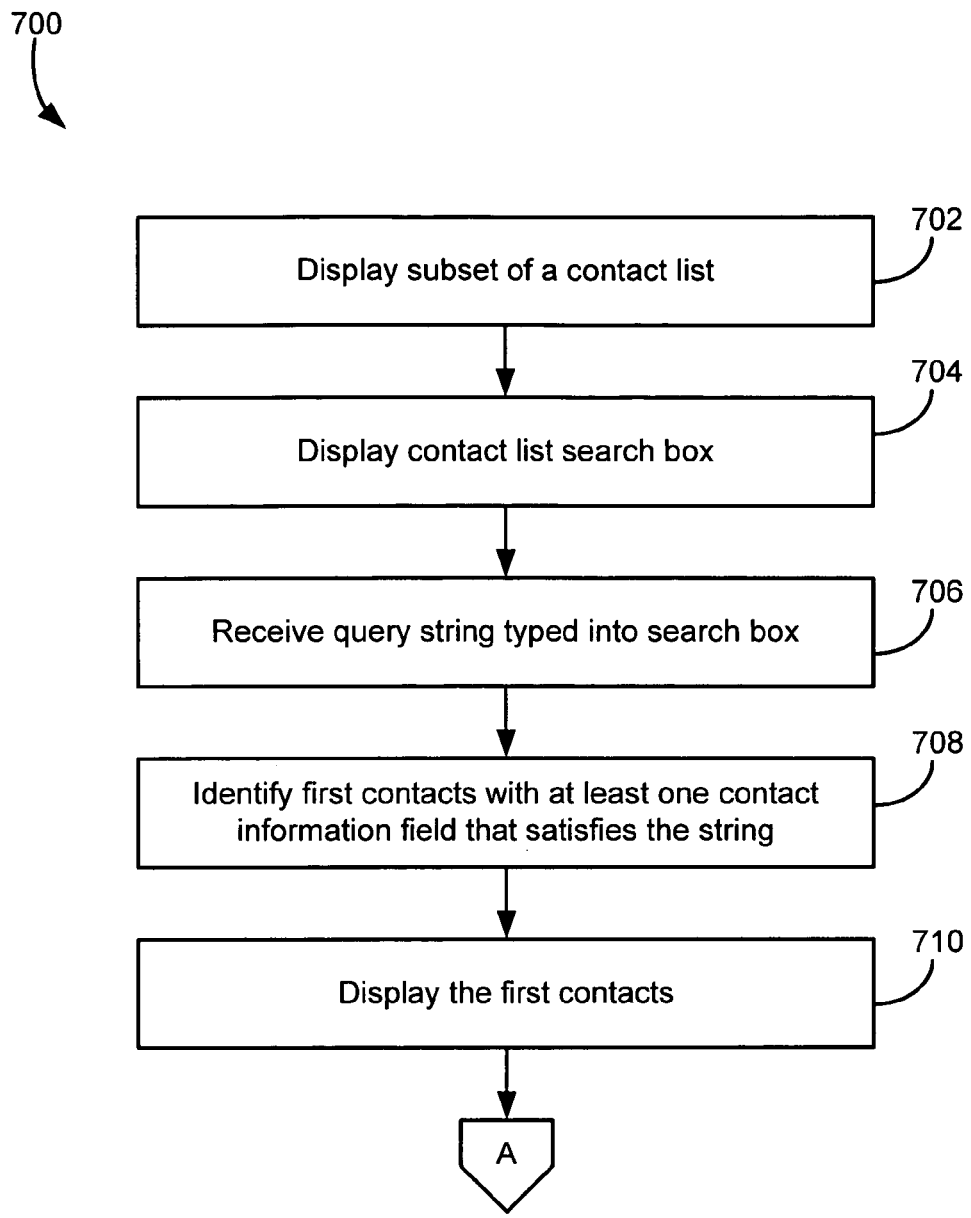
FIGS. 7A and 7B are flow diagrams of a process for searching a contact list, in accordance with some embodiments.
Figure 7B:
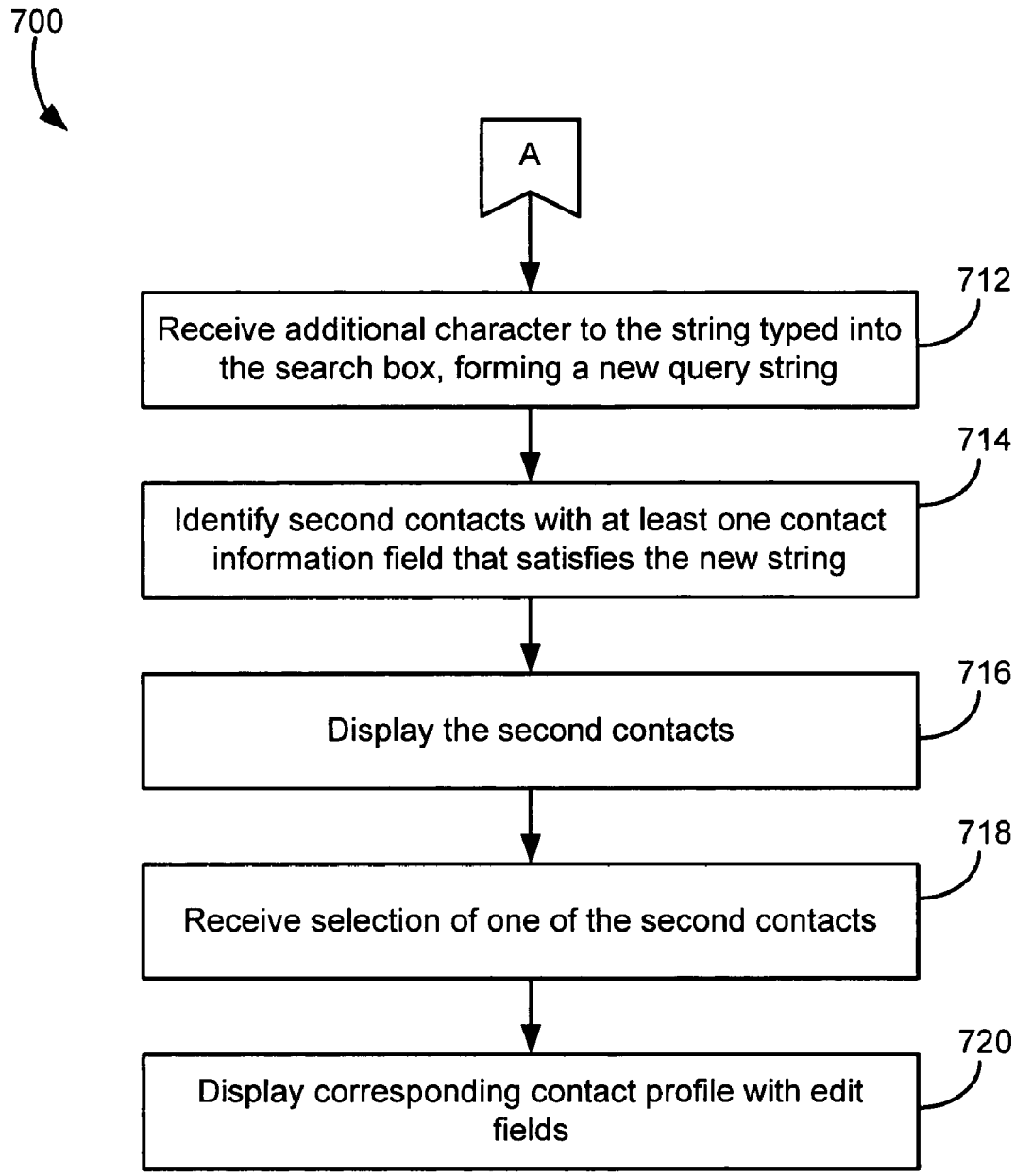

FIGS. 7A and 7B are flow diagrams of a process for searching a contact list, in accordance with some embodiments. Process flow 700 describes a process where a contact list search query may be made and the search is performed on all contact information fields, not just on the names of contacts. Furthermore, search results are displayed in real-time or near-real time as the search string is entered, akin to autocomplete; typing an additional character into a query string may change the search results that are displayed.

A subset of a contact list of a user is displayed (702). The contact list may be displayed in the window of a chat application. In some embodiments, the subset of the contact list that is displayed may be the contacts that had most recently sent the user a message. In some other embodiments, the contacts that are displayed are the contacts with whom the user has sent and received the most messages. Alternately, a score may be associated with each contact in a user's contact list, and contacts having the highest scores may be selected as the subset of contacts to be displayed. A contact list search box is displayed as well (704), into which a user may type in a query. The contact list may be searched for contacts that match the query without requiring the user to initiate the search (e.g., no click or other action is required to initiate the search).

A query string typed into the search box by the user is received (706). A first set of contacts, each of which having at least one contact information field that satisfies the query string, is identified (708). The identification (search using the query string) is performed over the entire list of contacts, not just the subset of contacts that is displayed in block 702. In some embodiments, a contact information field satisfies the query string if the string is a substring of a term that is included in the contact information field. For example, the query string "joh" is satisfied by the terms "Johannes," "Mikeljohn" and "Mike@johnson.com." The first set of contacts that have contact information satisfying the query string is displayed in the chat application window (710). In some other embodiments, a contact information field satisfies the query string if the string matches the beginning portion of the contact information field or any predefined subfield of the contact information field. For example, the query string "joh" is satisfied by the terms "Johannes," "Mike Johnson" and "Mike@johnson.com," because in each of these examples the string "joh" is found at the beginning portion of the term or a predefined subfield of the term.

An additional character to the query string is received (712). The additional character is typed into the search box and appended to the query string. The query string and the additional character form a new query string. A second set of contacts, each of which having at least one contact information field that satisfies the new query string, is identified (714). The identification (search using the query string) is performed over the entire list of contacts, not just the subset of contacts that is displayed in block 702. As noted above, in some embodiments a contact information field satisfies the new query string if the new string is a substring of a term that is included in the contact information field. For example, the query string "john" is satisfied by the term "Mikeljohn" but not "Johannes." Alternately, as noted above, a contact information field satisfies the query string if the string matches the beginning portion of the contact information field or any predefined subfield of the contact information field. Regardless of the rule for matching the query string to particular contact information fields, the second set of contacts that satisfy the new search string may be different from the first set of contacts that satisfy the original search string. The second set of contacts that satisfy the new query string is displayed in the window (716).

It is noted that the identification of the first and second sets of contacts are responsive to the receipt of the query strings, and do not require the user to explicitly initiate a search. This is mode of operation may be called an "autocomplete" methodology or mode of operation, because the search and identification functions are performed automatically upon entry of a query string.

A selection of one of the second set of contacts is received (718). In response to the selection, the contact profile for the selected contact is displayed, along with edit fields for the contact information fields in the contact profile (720).

In some embodiments, the set of contact information fields that are searched by the autocomplete contact list search feature include fields other than name, handle (e.g., IM username) and email fields. For instance, the set of contact information fields that are searched may include one or more of the following: (A) a field, or subfield, that stores the domain portion of a contact's email address (enabling searches for contacts having domain names that match the search query); (B) one or more telephone number fields (e.g., enabling searches for contacts having telephone numbers with a particular area code); (C) one or more physical address fields, such as address fields that store street, city, state and/or postal address information (e.g., enabling searches for contacts located in a particular city, state or country, or having an address on a particular street); (D) other fields that store supplemental information, such as business names, names of associates or other people related to the contact, or miscellaneous information (e.g., enabling searches for contacts who work at a particular business, or who are closely associated with another contact, e.g., the assistant or partner of another contact). In some embodiments, the set of contact information fields that are searched include at least two of the previously listed examples, as well as name, handle and/or email fields.

Figure 11A:
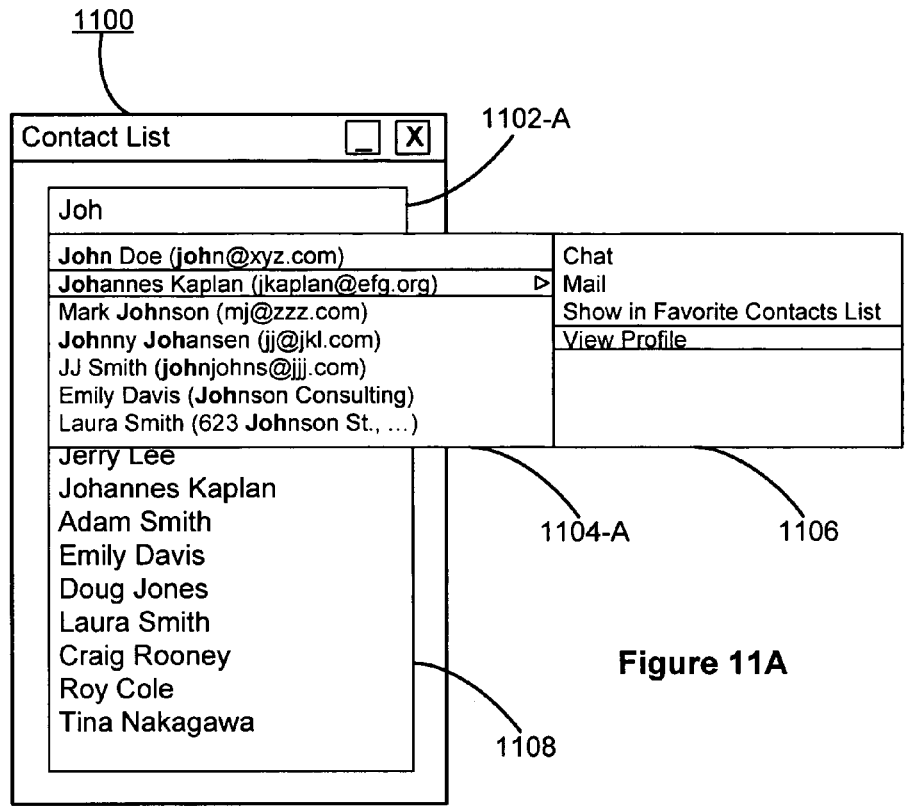
Figure 11B:
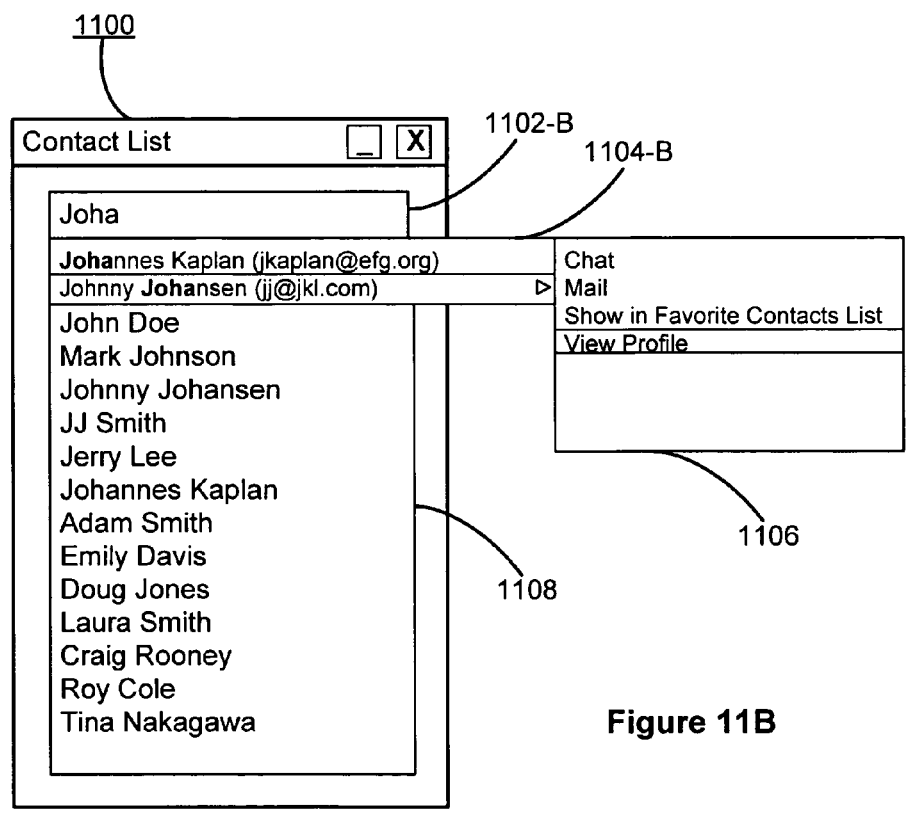

Examples of a contact list search with autocomplete are shown in FIGS. 11A, 11B, and 11C. FIG. 11A shows a contact list window 1100, in which a contact list subset 1108 is displayed. In some embodiments, the contact list window 1100 is a chat application window in which the contact list is displayed. Within the window 1100 is a contact list search box 1102-A. A query string may be typed into the search box 1102-A. The search results 1104-A shows the contacts that satisfy the query. The contacts that satisfy the query includes contacts whose names include the query string as a substring and contacts whose other contact information fields (such as email, street address, company) include the query string as a substring. When a contact in the search results 1104-A is highlighted, a menu of actions 1106 may be shown. Amongst the available options are sending a chat or email message to the contact and viewing the profile of the contact. In some embodiments, clicking on a contact from the search results 1104-A brings up the profile for the selected contact.

Without deleting the query string, additional characters may be typed into the search box, forming a new query string. FIG. 11B illustrates the new query string in search box 1102-B. The search results 1104-B shows a list of contacts that satisfy the new query string. As with FIG. 11A, when a contact in the search results is highlighted, a menu of action 1106 may be shown. In some embodiments, clicking on a contact from the search results 1104-B brings up the profile for the selected contact.

FIG. 11C illustrates a profile for a contact with text fields for editing the contact information within the profile. The profile includes contact information fields such as first and last name, address, email address, phone number, company, and so forth. A text box is provided for each of these fields. The text box displays information that is currently stored for the field and allows for editing of that information. The profile also includes buttons for saving any edited information or canceling out of the profile display.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing messages at a server system, comprising:

receiving one or more email messages in a conversation between a first user and a second user;

receiving a chat message that responds to one of the email messages in the conversation; and transmitting for display at a client device a representation of the conversation, including items corresponding to each of the email messages in the conversation and an item corresponding to the chat message, wherein the representation of the conversation includes a plurality of separate regions for concurrent display at the client, the plurality of separate regions including one or more email message regions, each displaying the contents of a respective email message, and a chat session region displaying the contents of the chat message;

wherein at least two of the plurality of concurrently displayed regions each include one or more links for responding to the respective message, the one or more links being located within the region of the respective message.

2. A method of claim 1, wherein the first user or the second user can select a respective link of the one or more links to respond to any one of the messages regardless of which message is most recent.

3. A method of claim 1, wherein responding to the respective message is selected from the group consisting of forwarding the message, replying to the message, and replying to the message by chat.

4. A method of claim 1, wherein the chat session region includes contents of a plurality of chat messages.

5. A method of claim 1, wherein the at least two of the plurality of concurrently displayed regions that each include one or more links for responding to the respective message comprise the chat session region and at least one of the email message regions.

6. A method of processing messages at a client device, comprising:
    receiving and sending a plurality of email messages in a conversation between a first user and a second user;
    sending a chat message from the first user to the second user that responds to one of the email messages in the conversation; and
    concurrently displaying at the client device associated with the first user a representation of the conversation, including items corresponding to each of the email messages in the conversation and an item corresponding to the chat message, wherein the representation of the conversation includes a plurality of separate regions, the plurality of separate regions including one or more email message regions, each displaying the contents of a respective email message, and a chat session region displaying the contents of the chat message;
    wherein at least two of the plurality of concurrently displayed regions each include one or more links for responding to the respective message, the one or more links being located within the region of the respective message.

7. A method of claim 6, wherein the first user or the second user can select a respective link of the one or more links to respond to any one of the messages regardless of which message is most recent.

8. A method of claim 6, wherein responding to the respective message is selected from the group consisting of forwarding the message, replying to the message, and replying to the message by chat.

9. A method of claim 6, wherein the chat session region includes contents of a plurality of chat messages.

10. A method of claim 6, wherein the at least two of the plurality of concurrently displayed regions that each include one or more links for responding to the respective message comprise the chat session region and at least one of the email message regions.

11. A system for processing messages, comprising:
    memory, one or more processors, and one or more programs, stored in the memory and executed by the one or more processors, the one or more programs including one or more modules comprising instructions:
        to receive one or more email messages in a conversation between a first user and a second user;
        to receive a chat message that responds to one of the email messages in the conversation; and
        to transmit for display at a client device a representation of the conversation, including items corresponding to each of the email messages in the conversation and an item corresponding to the chat message, wherein the representation of the conversation includes a plurality of separate regions for concurrent display at the client, the plurality of separate regions including one or more email message regions, each displaying the contents of a respective email message, and a chat session region displaying the contents of the chat message;
    wherein at least two of the plurality of concurrently displayed regions each include one or more links for responding to the respective message, the one or more links being located within the region of the respective message.

12. A system of claim 11, wherein the first user or the second user can select a respective link of the one or more links to respond to any one of the messages regardless of which message is most recent.

13. A system of claim 11, wherein responding to the respective message is selected from the group consisting of forwarding the message, replying to the message, and replying to the message by chat.

14. A system of claim 11, wherein the chat session region includes contents of a plurality of chat messages.

15. A system of claim 11, wherein the at least two of the plurality of concurrently displayed regions that each include one or more links for responding to the respective message comprise the chat session region and at least one of the email message regions.

16. A system for processing messages, comprising:
    memory, one or more processors, and one or more programs, stored in the memory and executed by the one or more processors, the one or more programs including one or more modules comprising instructions:
        to receive and to send one or more email messages in a conversation between a first user and a second user;
        to send a chat message from the first user to the second user that responds to one of the email messages in the conversation; and
        to concurrently display at a client device associated with the first user a representation of the conversation, including items corresponding to each of the email messages in the conversation and an item corresponding to the chat message, wherein the representation of the conversation includes a plurality of separate regions, the plurality of separate regions including one or more email message regions, each displaying the contents of a respective email message, and a chat session region displaying the contents of the chat message;
    wherein at least two of the plurality of concurrently displayed regions each include one or more links for responding to the respective message, the one or more links being located within the region of the respective message.

17. A system of claim 16, wherein the first user or the second user can select a respective link of the one or more links to respond to any one of the messages regardless of which message is most recent.

18. A system of claim 16, wherein responding to the respective message is selected from the group consisting of forwarding the message, replying to the message, and replying to the message by chat.

19. A system of claim 16, wherein the chat session region includes contents of a plurality of chat messages.

20. A system of claim 16, wherein the at least two of the plurality of concurrently displayed regions that each include one or more links for responding to the respective message comprise the chat session region and at least one of the email message regions.

21. A computer readable storage medium storing one or more programs for execution by one or more processors of a computer system, the one or more programs comprising instructions for:
  receiving one or more email messages in a conversation between a first user and a second user;
  receiving a chat message that responds to one of the email messages in the conversation; and
  transmitting for display at a client device a representation of the conversation, including items corresponding to each of the email messages in the conversation and an item corresponding to the chat message, wherein the representation of the conversation includes a plurality of separate regions for concurrent display at the client, the plurality of separate regions including one or more email message regions, each displaying the contents of a respective email message, and a chat session region displaying the contents of the chat message;
  wherein at least two of the plurality of concurrently displayed regions each include one or more links for responding to the respective message, the one or more links being located within the region of the respective message.

22. A computer readable storage medium of claim 21, wherein the first user or the second user can select a respective link of the one or more links to respond to any one of the messages regardless of which message is most recent.

23. A computer readable storage medium of claim 21, wherein responding to the respective message is selected from the group consisting of forwarding the message, replying to the message, and replying to the message by chat.

24. A computer readable storage medium of claim 21, wherein the chat session region includes contents of a plurality of chat messages.

25. A computer readable storage medium of claim 21, wherein the at least two of the plurality of concurrently displayed regions that each include one or more links for responding to the respective message comprise the chat session region and at least one of the email message regions.

26. A computer readable storage medium storing one or more programs for execution by one or more processors of a computer system, the one or more programs comprising instructions for:
  receiving and sending one or more email messages in a conversation between a first user and a second user;
  sending a chat message from the first user to the second user that responds to one of the email messages in the conversation; and
  concurrently displaying at a client device associated with the first user a representation of the conversation, including items corresponding to each of the email messages in the conversation and an item corresponding to the chat message, wherein the representation of the conversation includes a plurality of separate regions, the plurality of separate regions including one or more email message regions, each displaying the contents of a respective email message, and a chat session region displaying the contents of the chat message;
  wherein at least two of the plurality of concurrently displayed regions each include one or more links for responding to the respective message, the one or more links being located within the region of the respective message.

27. A computer readable storage medium of claim 26, wherein the first user or the second user can select a respective link of the one or more links to respond to any one of the messages regardless of which message is most recent.

28. A computer readable storage medium of claim 26, wherein responding to the respective message is selected from the group consisting of forwarding the message, replying to the message, and replying to the message by chat.

29. A computer readable storage medium of claim 26, wherein the chat session region includes contents of a plurality of chat messages.

30. A computer readable storage medium of claim 26, wherein the at least two of the plurality of concurrently displayed regions that each include one or more links for responding to the respective message comprise the chat session region and at least one of the email message regions.

31. A system for processing messages, comprising:
  means for receiving one or more email messages in a conversation between a first user and a second user;
  means for receiving a chat message that responds to one of the email messages in the conversation; and
  means for transmitting for display at a client device a representation of the conversation, including items corresponding to each of the email messages in the conversation and an item corresponding to the chat message, wherein the representation of the conversation includes a plurality of separate regions for concurrent display at the clients the plurality of separate regions including one or more email message regions, each displaying the contents of a respective email message, and a chat session region displaying the contents of the chat message;
  wherein at least two of the plurality of concurrently displayed regions each include one or more links for responding to the respective message, the one or more links being located within the region of the respective message.

32. A system for processing messages, comprising:
  means for receiving and sending one or more email messages in a conversation between a first user and a second user;
  means for sending a chat message from the first user to the second user that responds to one of the email messages in the conversation; and
  means for concurrently displaying at a client device associated with the first user a representation of the conversation, including items corresponding to each of the email messages in the conversation and an item corresponding to the chat message, wherein the representation of the conversation includes a plurality of separate regions, the plurality of separate regions including one or more email message regions, each displaying the contents of a respective email message, and a chat session region displaying the contents of the chat message;
  wherein at least two of the plurality of concurrently displayed regions each include one or more links for responding to the respective message, the one or more links being located within the region of the respective message.

* * * * *